(12) United States Patent
Taherloo

(10) Patent No.: US 8,391,776 B2
(45) Date of Patent: Mar. 5, 2013

(54) ECHO LIGHT

(76) Inventor: Babak Taherloo, Copenhagen NV (DK)

( * ) Notice: Subject to any disclaimer, the term of this patent is extended or adjusted under 35 U.S.C. 154(b) by 395 days.

(21) Appl. No.: 12/455,795

(22) Filed: Jun. 8, 2009

(65) Prior Publication Data

US 2010/0311344 A1 Dec. 9, 2010

(51) Int. Cl.
*H04H 40/00* (2008.01)

(52) U.S. Cl. ........................ 455/3.06; 455/345

(58) Field of Classification Search ............... 455/569.2, 455/569.9, 69, 152.1, 297, 345, 575.9, 99, 455/96, 3.06
See application file for complete search history.

(56) References Cited

U.S. PATENT DOCUMENTS

| 4,352,200 | A  | * | 9/1982  | Oxman           | 455/41.2 |
|-----------|----|---|---------|-----------------|----------|
| 5,580,140 | A  |   | 12/1996 | Katz et al.     |          |
| 6,813,777 | B1 | * | 11/2004 | Weinberger et al. | 725/76 |
| 7,175,321 | B1 | * | 2/2007  | Lopez           | 362/496  |
| 7,180,475 | B2 | * | 2/2007  | Slobodin et al. | 345/2.3  |
| 7,280,166 | B2 | * | 10/2007 | Nagata et al.   | 348/837  |
| 2008/0305806 | A1 | * | 12/2008 | Jung et al.  | 455/456.1 |
| 2009/0046140 | A1 | * | 2/2009  | Lashmet et al. | 348/51 |
| 2009/0310035 | A1 | * | 12/2009 | Jung et al.  | 348/744 |

FOREIGN PATENT DOCUMENTS

| DE | 19502614 | 9/1995 |
| EP | 1085492  | 3/2001 |
| GB | 2317985  | 4/1998 |
| WO | 93/16459 | 8/1993 |
| WO | 94/07233 | 3/1994 |
| WO | 03060859 | 7/2003 |

* cited by examiner

*Primary Examiner* — Tu X Nguyen
(74) *Attorney, Agent, or Firm* — McGinn IP Law Group, PLLC

(57) ABSTRACT

A Projector mounted on a means of transport, henceforth vessel, displaying visual media on the surroundings of the vessel, and broadcasting a wireless audio signal which allows the users of the vessel to receive the sound associated with the visual media being displayed.

Figure 2:
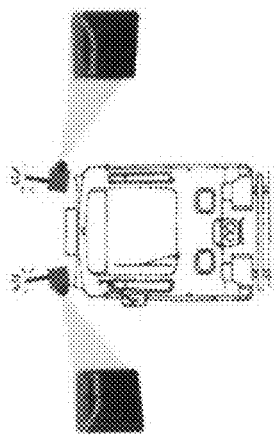

The data for the visual and audio media content is sent by a central server to a server aboard the vessel, which then transmits the visual media content to the projectors mounted on the vessel, to be displayed on the surroundings, and the audio signal to be transmitted wirelessly to the users of the vessel.

5 Claims, 1 Drawing Sheet

ECHO LIGHT

FIELD OF THE INVENTION

The present invention relates generally to giving passengers in a vessel like trains or underground trains, a possibility to view and hear, media content, displayed on the wall or other items surrounding the vessel, and receiving the audio as a wireless signal, with personal devices, such as Fm receivers. The term vessel will throughout this document and henceforth, be used as a general term for any tool, machine, vehicle, train, vessel, ship, aircraft, and any utility used for transport, whether it be on ground, on water or in air, whether it be with passengers or without.

BACKGROUND OF THE INVENTION

The invention will be described with the reference to a moving vessel, with a projector mounted on the sides, displaying visual media content on its surroundings, while the sound associated with the media being displayed, will be broadcasted wirelessly to users of the vessel, who can receive the sound be using wireless receivers.

It is desirable for passenger to sit in a train, a transport vessel, a underground train, and view media content, on the wall or surroundings of the vessel.

Although projectors are in use today, they have not been in use for displaying media content on the wall or surroundings of a moving vessel, like a train passing threw a tunnel. The walls which so far could not be used for media content, such as promotional, informational or marketing purposes. This is because of the difficulties to put up or maintain almost any form of advertisement or media inside these tunnels, without delaying the traffic, or other difficulties connected with this form of advertisement. With Echolight it will now be possible and much more handy.

The idea and effort of this invention is to broadcast media, advertise, or give information to users or passengers of a vessel, and at the same time to minimize the delay and maintenance cost involved with these kind of project.

SUMMARY OF INVENTION

The present invention, provides a projector which is mounted on a vessel, displaying media content on the surroundings of the vessel, and transmitting a wireless audio signal to the passengers or users of the vessel. The wireless audio signal may be transmitted by short distance FM or other available wireless transmitters. This wireless signal can then be received by the users of the vessel, using their wireless receivers, as an example they can use the FM-Radio in their cell phone.

DETAILED DESCRIPTION

A Projector with an Antenna

This projector will be mounted on the sides of a moving vessel, moving threw a tunnel or areas where the light of the projector is viewable.

It will receive data in the form of visual and audio, from a server aboard the vessel, and display the visual media on the surroundings of the vessel, and transmit a wireless audio signal which can be received by users of the vessel.

The data given to the projector by the server onboard the vessel can be any available media.

Ex: moving Pictures, film, text, sound, images, animation.

Text can appear with the visual media, and will primarily be used by those who do not carry a wireless receiver.

If the passengers or users of the vessel wish they can hear the sound associated with the media being displayed by the projector, by receiving a wireless signal, which is broadcasted by the projector, or by the server onboard the vessel, using a wireless receiver, Ex: Devices with FM Radio Receiver, Bluetooth Devices.

These projectors will stop and start transmitting according to a schedule giving to it remotely by the server aboard the vessel, which is given to the server aboard the vessel remotely by a central server.

It can also be done by preprogramming the server aboard the vessel, by authorized personal.

Servers Aboard the Vessel

These servers will constantly be communicating and synchronizing with a central server, or by specialist technicians, and as a result of this these servers can be updated so that the data for the media can be updated.

Central Server

This server will send and receive the data and media to the server aboard the vessel, that the server aboard the vessel will transmit to the projectors who will broadcast the visual media and transmit a wireless audio signal.

Figure 1:
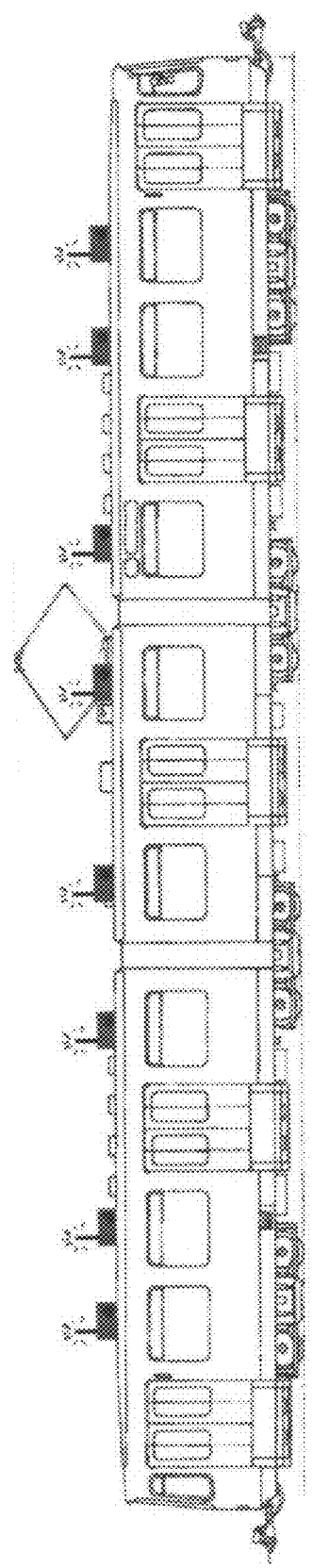

Description of FIGS. 1 and 2:

FIG. 1:

An example of the projectors mounted on the train. The train being displayed from the side, and the projectors mounted above the windows of the train, thereby displaying the visual content so it can be seen by the passengers of the train.

FIG. 2:

Here the train being displayed from its front and the figure shows an example of the projectors displaying the visual content, on the sides of the train.

What is claimed is:
1. A projector system, comprising:
 a projector mounted on a moving vessel, said vessel comprising one of a tool, a machine, a vehicle, a train, a ship, and a utility used for transport, the projector displaying a visual media content on a wall of a ground based structural surrounding the vessel, and transmitting to a user a wireless audio signal associated with visual media information;
 a receiver for wirelessly receive the visual media content and the audio from a server aboard the vessel;
 a transmitter to wirelessly transmit to a cell phone or a bluetooth devices of the user the audio associated with the visual media content displayed on the wall by the projector;
 the server aboard the vessel comprising a receiver to receive the visual media content and the audio from the central server, a transmitter to transmit the visual media content and the audio to the projector, a processor to process the visual content and the audio; and
 a central server comprising a receiver and a transmitter to communicate with the server aboard the vessel for update, schedule, and maintenance purposes, and for sending the visual media content and the audio to the server aboard vessel,
 wherein the projector displays the visual media on the ground based structural while the vessel passes through the ground based structural, and
 wherein the projector stops and starts transmitting the visual media content based on schedule instructions from the server aboard the vessel depending on a location of the vessel with respect to the ground based structural.

2. the projector system of claim 1, wherein the ground based structural comprises a tunnel that the vessel passes through.

3. A projector system, comprising:
a projector mounted on a moving vehicle, the projector displaying a visual media, which is viewed by a user of the vehicle, on a ground based structural surroundings the vehicle;
a wireless audio transmitter that transmits to the user an audio associated with the visual media displayed by the projector;
a server aboard the vehicle that transmits the visual media to the projector and the audio to the wireless audio transmitter; and
a central server that communicate with the server aboard the vehicle for updating, scheduling, and maintenance of the server abroad the vehicle, and sends the visual media and the audio to the server aboard the vehicle,
wherein the ground based structural comprises a tunnel that the vehicle passes through,
wherein the vehicle comprises one of a train, a vessel, a ship, and a utility device for transportation,
wherein the projector displays the visual media on the ground based structural while the vehicle passes through the ground based structural, and
wherein the projector stops and starts transmitting the visual media based on schedule instructions from the server aboard the vehicle.

4. The projector system of claim 3, wherein the user receives the audio via a cell phone or a Bluetooth device.

5. A projector system, comprising:
a projector mounted on a moving vehicle, the projector displaying a visual media, which is viewed by a user of the vehicle, on a ground based structural surroundings the vehicle;
a wireless audio transmitter that transmits to the user an audio associated with the visual media displayed by the projector;
a server aboard the vehicle that transmits the visual media to the projector and the audio to the wireless audio transmitter; and
a central server that communicate with the server aboard the vehicle for updating, scheduling, and maintenance of the server abroad the vehicle, and sends the visual media and the audio to the server aboard the vehicle,
wherein the ground based structural comprises a tunnel that the vehicle passes through,
wherein the vehicle comprises one of a train, a vessel, a ship, and a utility device for transportation,
wherein the projector displays the visual media on the ground based structural while the vehicle passes through the ground based structural, and
wherein the projector stops and starts transmitting the visual media based on schedule instructions from the server aboard the vehicle depending on a location of the vehicle with respect to the ground based structural.

* * * * *